United States Patent [19]

Kim

[11] Patent Number: 5,748,158

[45] Date of Patent: May 5, 1998

[54] APPARATUS AND METHOD FOR DISPLAYING OPERATING STATES AND CHARACTERISTICS OF A COMPUTER SYSTEM VIA ICONS AND ALPHANUMERIC REPRESENTATIONS

[75] Inventor: Sung-Soo Kim, Kyunggi-do, Rep. of Korea

[73] Assignee: SamSung Electronics Co., Ltd., Suwon, Rep. of Korea

[21] Appl. No.: 605,898

[22] Filed: Feb. 23, 1996

[30] Foreign Application Priority Data

Feb. 24, 1995 [KR] Rep. of Korea ............... 3700/1995

[51] Int. Cl.$^6$ ............................................. G06F 1/00
[52] U.S. Cl. ............................................. 345/33
[58] Field of Search .......................... 345/33, 23–25, 345/133; 398/348, 349; 399/81

[56] References Cited

U.S. PATENT DOCUMENTS

| | | |
|---|---|---|
| 4,899,140 | 2/1990 | Ito et al. |
| 5,301,293 | 4/1994 | Kano. |
| 5,442,740 | 8/1995 | Parikh ............................ 395/348 |
| 5,448,693 | 9/1995 | Blades et al. ................... 395/348 |
| 5,448,695 | 9/1995 | Douglas et al. ................. 395/348 |
| 5,508,600 | 4/1996 | Myslinski et al. |
| 5,566,291 | 10/1996 | Boulton et al. |
| 5,574,843 | 11/1996 | Gerlach, Jr. .................... 395/348 |
| 5,579,252 | 11/1996 | Huang. |
| 5,596,697 | 1/1997 | Foster et al. .................... 395/348 |

*Primary Examiner*—Mark R. Powell
*Attorney, Agent, or Firm*—Robert E. Bushnell, Esq.

[57] ABSTRACT

An apparatus for displaying an operating state of a computer includes a controller for providing output of a read signal to receive data signals from a local bus. The controller analyzes the data signals and provides output of a display signal representative of the operating state of the computer based on the analysis of the data signals. An interface unit receives the data signals from a system bus, stores the data signals, and provides output of the data signals to the local bus in response to the read signal provided from the controller. A driving unit provides output of grid driving signals and segment driving signals in response to the display signal provided from the controller. A display panel variably provides an alphanumeric display indicating the operating state of the computer in accordance with the grid driving signals and the segment driving signals provided from the driving unit, and further provides iconic displays indicating the operating state of the computer in accordance with control signals provided from the computer.

14 Claims, 6 Drawing Sheets

FIG. 4
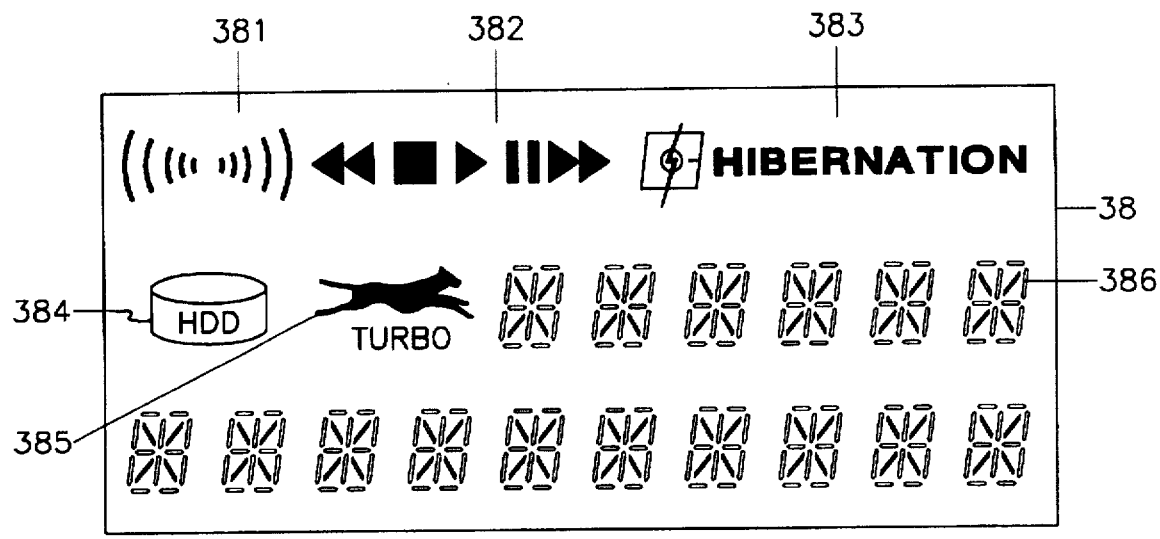
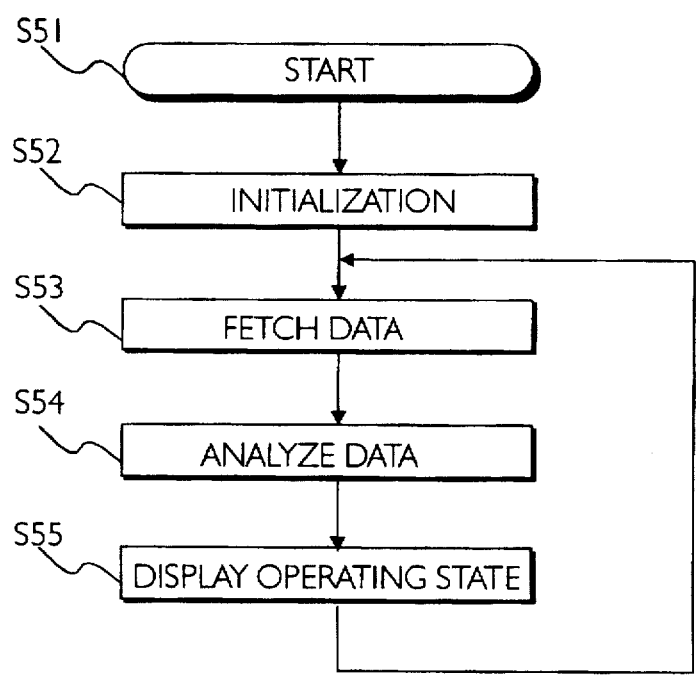
FIG. 5

APPARATUS AND METHOD FOR DISPLAYING OPERATING STATES AND CHARACTERISTICS OF A COMPUTER SYSTEM VIA ICONS AND ALPHANUMERIC REPRESENTATIONS

CROSS-REFERENCE TO RELATED APPLICATIONS

This application makes reference to, incorporates the same herein, and claims all benefits accruing under 35 U.S.C. §119 arising from an application for Apparatus And Method For Displaying An Operating State Of Computer earlier filed in the Korean Industrial Property Office on Feb. 24 1995 and there duly assigned Ser. No. 3700/1995.

BACKGROUND OF THE INVENTION

The present invention relates to an apparatus and method for displaying the operating state of a computer, and more particularly, to an apparatus and method for displaying the operating state of a computer by providing iconic and alphanumeric displays to demonstrate the operating state of the computer in a manner understandable by a novice user of a computer.

Generally, light emitting diodes (LEDs) are used to indicate the operating state of a computer. In particular, these light emitting diodes can be used to indicate the operation of various components of the computer. For example, U.S. Pat. No. 5,301,293 issued to Kano uses a light emitting diode to indicate the in-service state of a floppy disk apparatus. While this type of configuration for displaying the operating state of a computer may be appropriate for a seasoned computer user, such a configuration may not be understandable by a novice computer user. Accordingly, I believe that the operating state of a computer should be displayed in a way that is clearly intuitive to both novice and experienced computer users.

SUMMARY OF THE INVENTION

Therefore, it is an object of the present invention is to provide an improved apparatus and method for displaying the operating state of a computer.

It is another object to provide an apparatus and method for displaying the operating state of a computer by providing iconic displays.

It is still another object to provide an apparatus and method for displaying the operating state of a computer by providing an alphanumeric display.

It is yet another object to provide an apparatus and method for displaying the operating state of a computer in a manner that is understandable by a novice user of a computer.

These and other objects can be achieved according to the principles of the present invention with an apparatus and method for displaying an operating state of a computer. The apparatus includes a controller for providing output of a read signal to receive data signals from a local bus. The controller analyzes the data signals and provides output of a display signal representative of the operating state of the computer based on the analysis of the data signals. An interface unit receives the data signals from a system bus, stores the data signals, and provides output of the data signals to the local bus in response to the read signal provided from the controller. A driving unit provides output of grid driving signals and segment driving signals in response to the display signal provided from the controller. A display panel variably provides an alphanumeric display indicating the operating state of the computer in accordance with the grid driving signals and the segment driving signals provided from the driving unit, and further provides iconic displays indicating the operating state of the computer in accordance with control signals provided from the computer.

The method for displaying the operating state of the computer comprises the steps of: performing an initialization operation after power is provided to said computer, retrieving data signals from a local bus of the computer, analyzing the data signals and generating a display signal representing the operating state of the computer based on the analysis of the data signals, providing an alphanumeric display indicating the operating state of the computer in dependence upon the display signal, and providing iconic displays indicating the operating state of the computer in dependence upon computer control signals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 illustrates a display panel of the apparatus for displaying the operating state of a computer according to the preferred embodiment of the present invention;

FIG. 5 illustrates an operational flowchart of a method for displaying the operating state of a computer according to the preferred embodiment of the present invention;

DETAILED DESCRIPTION OF THE PREFERRED EMBODIMENT

Figure 1:
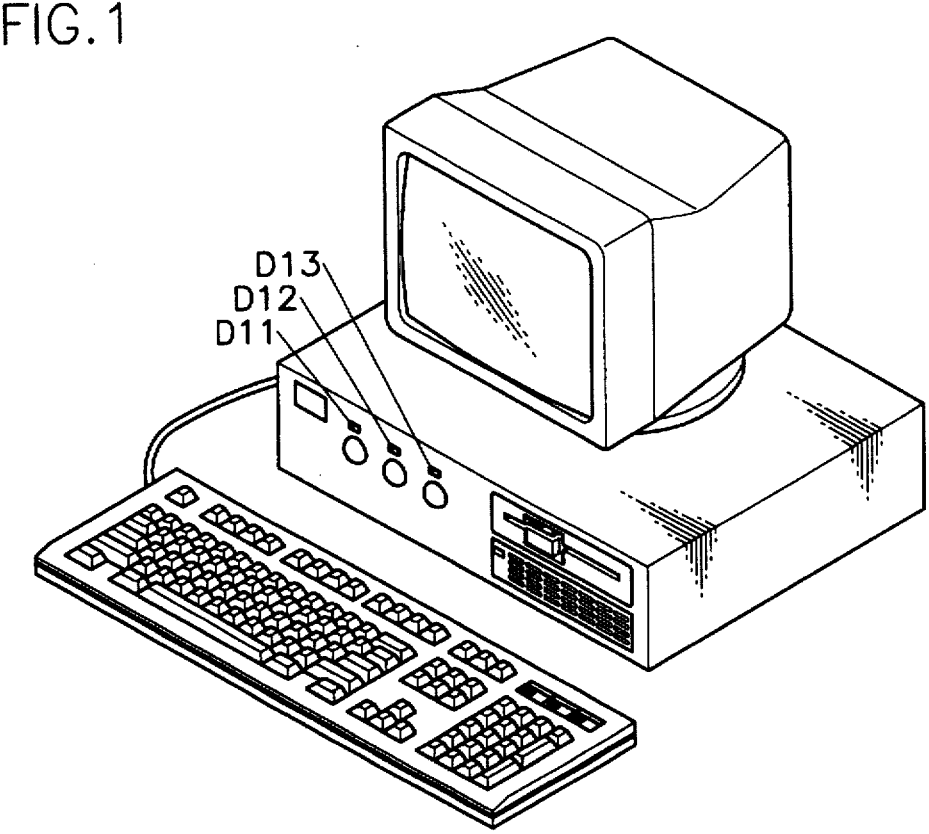
FIG. 1 illustrates a computer having a conventional apparatus for displaying the operating state of the computer.
Figure 2:
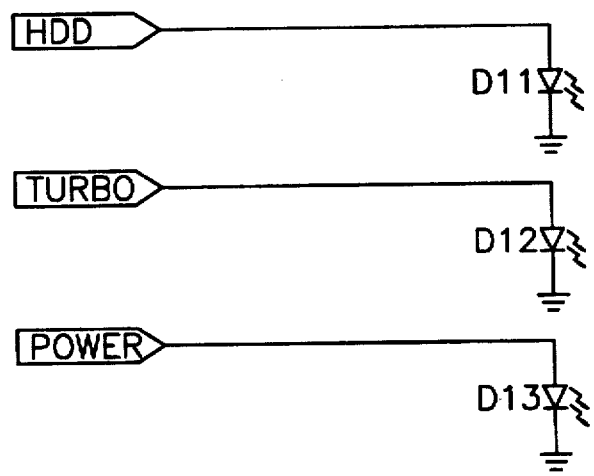
FIG. 2 illustrates a circuit diagram of the apparatus for displaying the operating state of the computer shown in FIG. 1.

Turning now to the drawings and referring to FIG. 1, a computer having a conventional apparatus for displaying the operating state of the computer is shown. FIG. 2 illustrates a circuit diagram of the apparatus for displaying the operating state of the computer shown in FIG. 1.

As shown in FIGS. 1 and 2, the conventional apparatus for displaying the operating state of a computer uses: a first light emitting diode D11 connected between a hard disk drive signal HDD line and a ground potential in a forward direction for displaying an operating state of a hard disk drive, a second light emitting diode D12 connected between a turbo signal TURBO line and a ground potential in a forward direction for displaying execution of a turbo mode, and a third light emitting diode D13 connected between a power signal POWER line and a ground potential in a forward direction for displaying a power state of the computer. As illustrated in FIG. 1, first through third light emitting diodes D11–D13 are typically mounted on the front panel of the computer to enhance user visibility.

Operation of the conventional apparatus shown in FIGS. 1 and 2 is as follows. When a user applies electrical power to the computer system by switching on the power, power signal POWER is output from a main board at a binary high level to enable operation of third light emitting diode D13. Accordingly, the user knows that power is being normally provided when third light emitting diode D13 emits light. When the user turns on a turbo switch to increase the clock speed of a central processing unit CPU, turbo signal TURBO is output from the main board at a binary high level to enable operation of second light emitting diode D12. Accordingly, the user knows that the turbo mode is being executed when second light emitting diode D12 emits light. Similarly, when the user accesses the hard disk, hard disk drive signal HDD is output from the hard disk drive at a binary high level to enable operation of first light emitting diode D11. Accordingly, the user knows that the hard disk is being accessed when first light emitting diode D11 emits light.

While the conventional apparatus of FIGS. 1 and 2 provides the user with some indication of the operating state of the computer, it also has some problems. First, only three operating characteristics of the computer can be displayed. Moreover, since the operating state of the computer is represented by simply turning light emitting diodes on and off, it is often difficult for a novice user of the computer to apprehend the meaning of these indications.

A preferred embodiment of the present invention will now be described with reference to FIGS. 3 through 9.

Figure 3A:
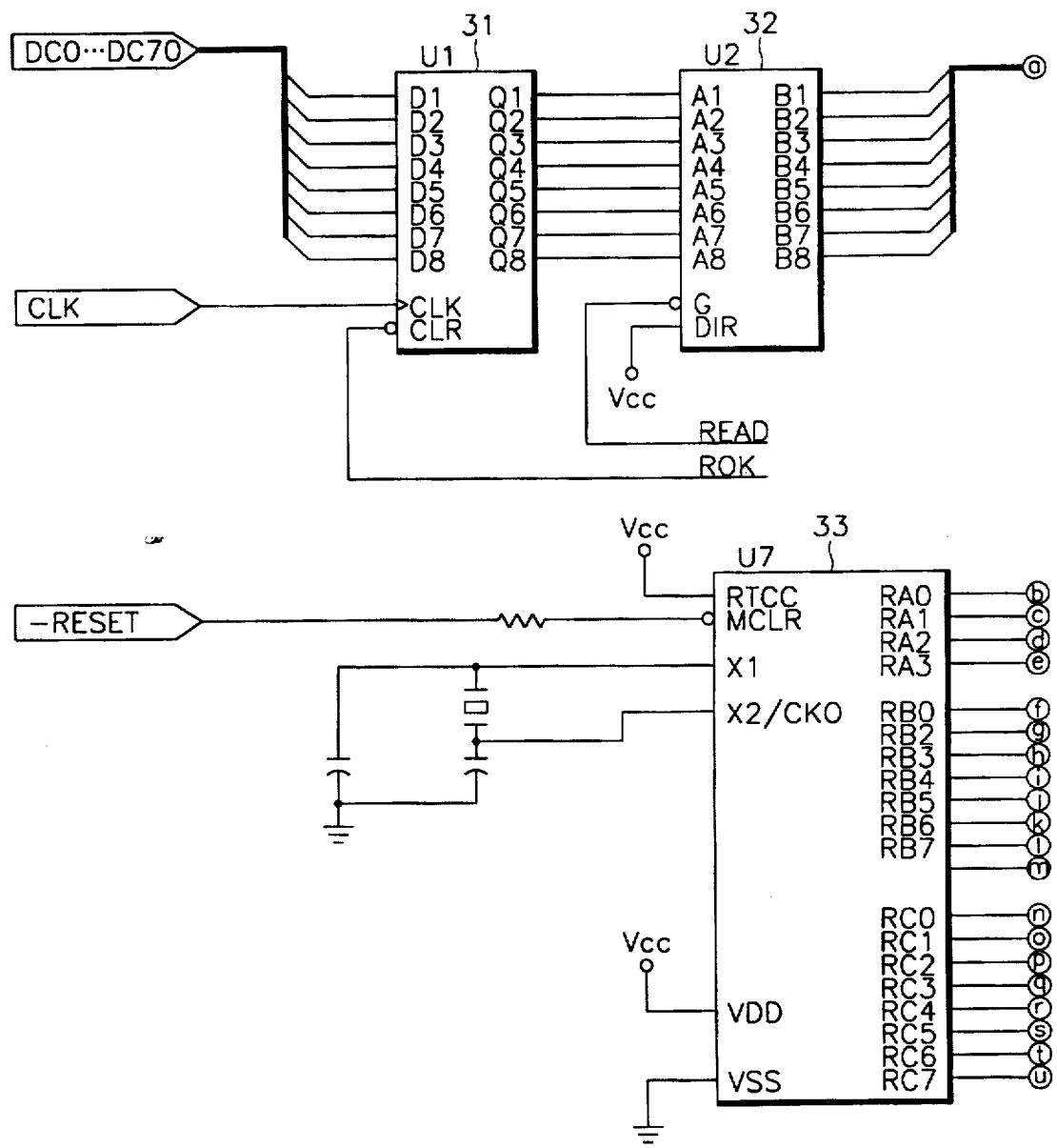
FIGS. 3A and 3B illustrate an apparatus for displaying the operating state of a computer according to a preferred embodiment of the present invention.
Figure 3B:
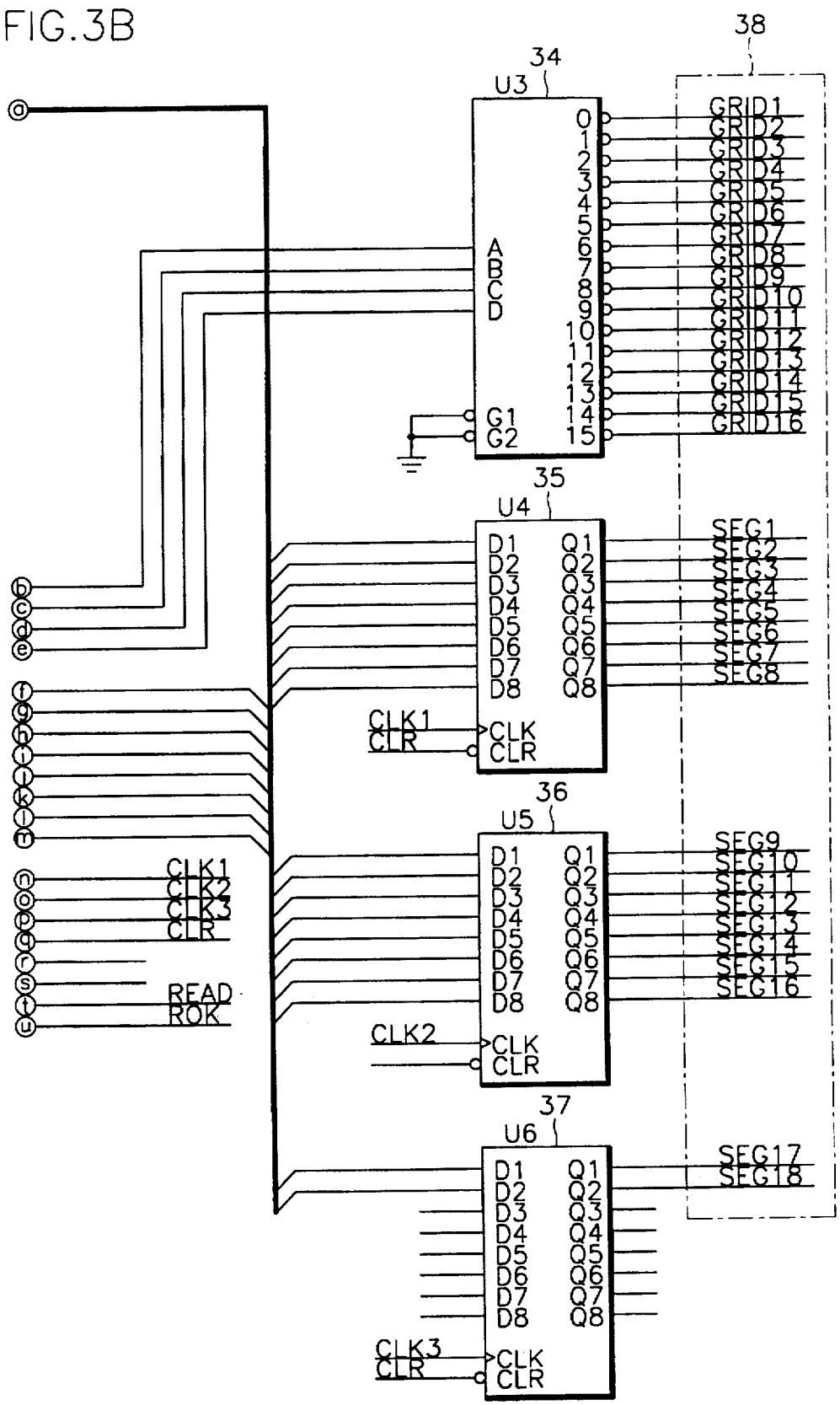

Referring to FIGS. 3A and 3B, an apparatus for displaying the operating state of a computer according to a preferred embodiment of the present invention is shown. The apparatus of FIGS. 3A and 3B comprises: a latch 31 having input terminals connected to receive data signals DC0–DC7 1s from a system bus and a clock signal CLK, a buffer 32 having input terminals connected to output terminals of latch 31 and a read signal READ line, a controller 33 having input terminals RB0–RB7 connected to a local bus, a decoder 34 having input terminals A–D connected to output terminals RA0–RA3 of controller 33, latches 35 through 37 having input terminals connected to a local bus and respectively connected to receive clock signals CLK1, CLK2 and CLK3 from controller 33, and a display panel 38 having input terminals connected to output terminals of decoder 34 and latches 35 through 37. Display panel 38 can be constructed using a liquid crystal display LCD, a vacuum fluorescent display or a light emitting diode LED. A block diagram of this apparatus is abstractly represented in FIG. 9.

Referring to FIG. 4, display panel 38 of the apparatus for displaying the operating state of a computer according to the preferred embodiment of the present invention is shown. Display panel 38 of FIG. 4 provides an alphanumeric display 386 for displaying alphanumeric messages representative of computer operating states. Examples of these messages can be seen in FIGS. 6 through 8 which will be discussed later. Display panel 38 further provides iconic displays including: a volume level meter 381 for indicating a volume level of music or other audible sounds being provided by the computer, a computer processing speed meter 382 for indicating a current processing speed of the computer, a hibernation mode display 383 for indicating execution of a hibernation (i.e., power saving) mode of the computer, a hard disk drive display 384 for indicating that the hard disk of the computer is being accessed, and a turbo mode display 385 for indicating execution of the turbo mode of the computer.

Referring to FIG. 5, an operational flowchart of a method for displaying the operating state of a computer according to the preferred embodiment of the present invention is shown. The method of FIG. 5 comprises the steps of: starting operation when power is provided (S51), performing an initialization operation by initializing a memory variable (S52), fetching data signals output from the main board (S53), analyzing the fetched data signals and generating a display signal representing the operating state of the computer (S54), and displaying information representing the operating state of the computer on display panel 38 by outputting the display signal (S55).

Operation of the apparatus for displaying the operating state of a computer according to the preferred embodiment of the present invention is as follows.

When power is provided, controller 33 begins performance of the program in FIG. 5, thereby starting operation of the apparatus of the present invention. Once the operation is started, controller 33 outputs read signal READ to buffer 32 and fetches data signals DC0–DC7 stored in latch 31 via the local bus. Controller 33 then outputs a clear signal ROK to latch 31, thereby clearing latch 31. Accordingly, new data signals DC0–DC7 are stored in latch 31.

When data signals DC0–DC7 are received through the local bus, controller 33 analyzes the contents of data signals DC0–DC7, generates the display signal representing the operating state of the computer based on the analysis of data signals DC0–DC7, and outputs the display signal to decoder 34 and latches 35 through 37. Controller 33 may use a dynamic illumination method in which the intensity of light is sequentially incremented, thereby providing an optical effect for the user.

Decoder 34 receives and decodes the display signal to thereby generate grid driving signals GRID1–GRID16 for output to display panel 38. Latches 35 through 37 generate segment driving signals SEG1–SEG18 for output to display panel 38 in response to the display signal. Grid driving signals GRID1–GRID16 are used to respectively select the sixteen display elements of alphanumeric display 386, and segment driving signals SEG1–SEG18 are used to indicate the alphanumeric character data displayed by the sixteen display elements of alphanumeric display 386. Volume level meter 381, computer processing speed meter 382, hibernation mode display 383, hard disk drive display 384, and turbo mode display 385 are operated according to the process of driving the light emitting diodes described in conjunction with FIG. 2. That is, iconic displays 381–385 are switched between on and off states to represent the operating state of the computer based on control signals provided from the computer.

Figure 6:
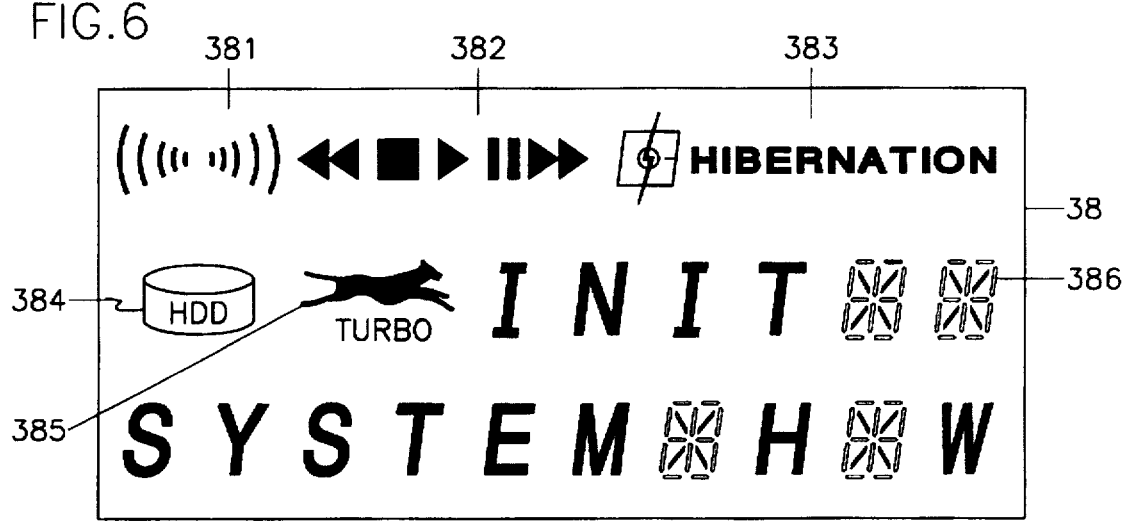
FIGS. 6 through 8 illustrate the display panel when displaying various alphanumeric messages representative of operating states of a computer according to the preferred embodiment of the present invention.
Figure 7:
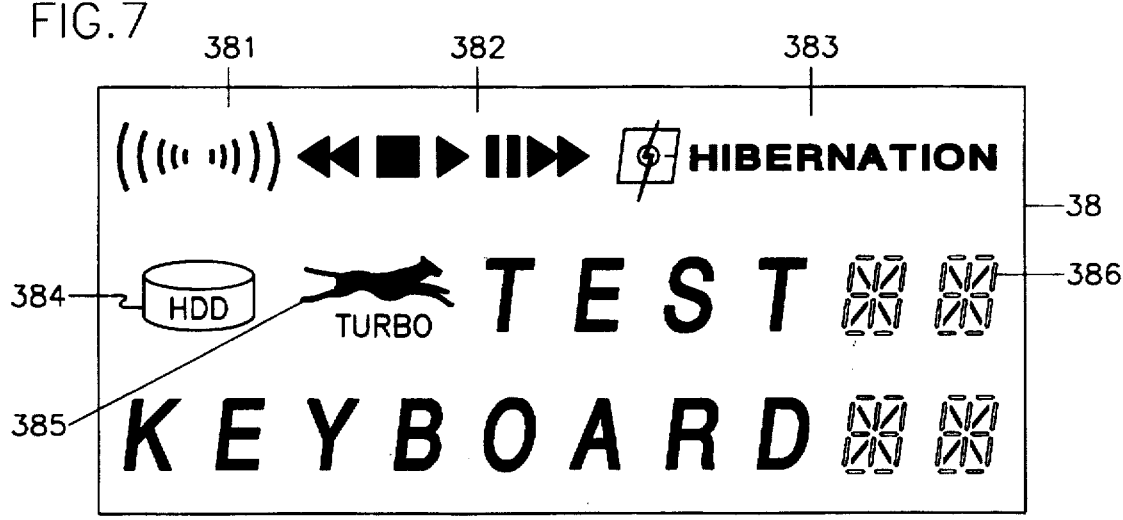
Figure 8:
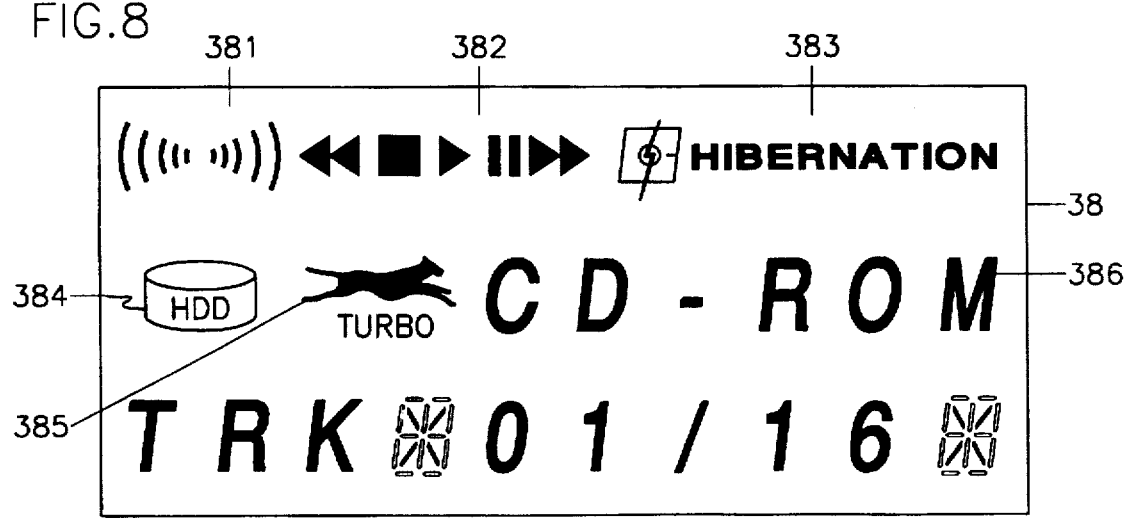
Figure 9:
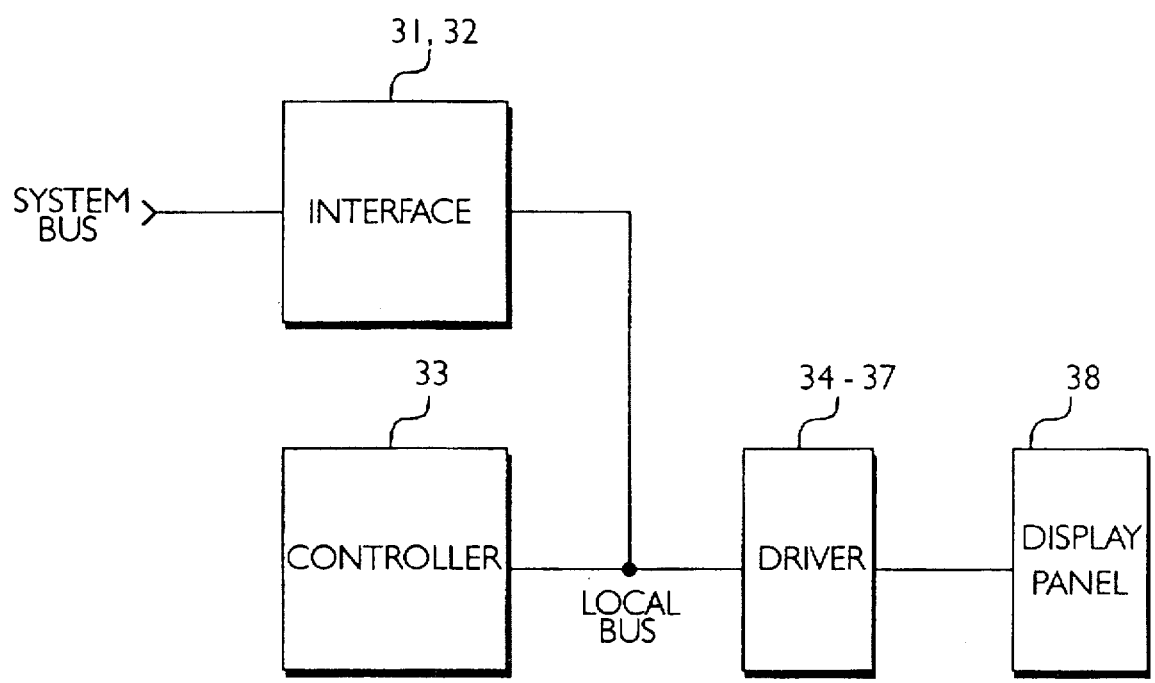
FIG. 9 illustrates a block diagram of the apparatus for displaying the operating state of a computer according to the preferred embodiment of the present invention.

In response to grid driving signals GRID1–GRID16 and segment driving signals SEG1–SEG18, display panel 38 provides an alphanumeric message, as illustrated in FIGS. 6 through 8, while one or more of the iconic displays 381–385 is typically driven, thereby providing a visual display representative of the operating state of the computer.

FIG. 6 illustrates an example of a message displayed on alphanumeric display 386 of display panel 38 during an initialization of the computer.

FIG. 7 illustrates an example of a message displayed on alphanumeric display 386 of display panel 38 when testing the keyboard after the initialization by supplying power to the computer.

FIG. 8 illustrates an example of a message displayed on alphanumeric display 386 of display panel 38 to indicate that a compact disk player (i.e., CD-ROM) is being presently operated and a first of sixteen tracks of music is being played by the compact disk player.

As described above, the present invention provides an apparatus and method for displaying the operating state of computer. In particular, the present invention displays the operating state of a computer by using specific icons and alphanumeric characters (instead of light emitting diodes) so that a novice user of the computer can easily apprehend the meaning of the display. The effects of th e invention can be widely used in the areas of planning, manufacturing, and sales of the computer system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for displaying an operating state of a computer, said apparatus comprising:

a controller for providing output of a read signal to receive data signals from a local bus, said controller analyzing said data signals and providing output of a display signal representative of said operating state of said computer based on the analysis of said data signals;

interface means for receiving said data signals from a system bus, storing said data signals, and providing output of said data signals to said local bus in response to said read signal provided from said controller;

driving means for providing output of grid driving signals and segment driving signals in response to said display signal provided from said controller; and a display panel for variably providing iconic displays and a plurality of alphanumeric displays indicating said operating state of said computer in accordance with said grid driving signals and said segment driving signals provided from said driving means.

2. The apparatus as claimed in claim 1, wherein said interface means comprises:

a latch for temporarily storing said data signals received from said system bus, said latch being cleared and then temporarily storing new data signals in response to a clear signal provided from said controller; and a buffer for receiving said data signals from said latch, and providing output of said data signals to said local bus in response to said read signal provided from said controller.

3. The apparatus as claimed in claim 1, wherein said driving means comprises:

a decoder for decoding said display signal provided from said controller to generate said grid driving signals, and providing output of said grid driving signals to said display panel; and latch means for generating and providing output of said segment driving signals to said display panel in response to said display signal.

4. The apparatus as claimed in claim 1, wherein said display panel comprises a liquid crystal display.

5. The apparatus as claimed in claim 1, wherein said display panel comprises a vacuum fluorescent display.

6. The apparatus as claimed in claim 4, wherein said iconic displays of said display panel comprise a volume level meter for indicating a volume level of sounds provided by said computer, a computer processing speed meter for indicating a processing speed of said computer, a hibernation mode display for indicating execution of a hibernation mode of said computer, a hard disk drive display for indicating that a hard disk of said computer is being accessed, and a turbo mode display for indicating execution of a turbo mode of said computer.

7. The apparatus as claimed in claim 5, wherein said iconic displays of said display panel comprise a volume level meter for indicating a volume level of sounds provided by said computer, a computer processing speed meter for indicating a processing speed of said computer, a hibernation mode display for indicating execution of a hibernation mode of said computer, a hard disk drive display for indicating that a hard disk of said computer is being accessed, and a turbo mode display for indicating execution of a turbo mode of said computer.

8. A method for displaying an operating state of a computer, comprising the steps of:

performing an initialization operation after power is provided to said computer;

retrieving data signals from a local bus of said computer;

analyzing said data signals and generating a display signal representing said operating state of said computer based on the analysis of said data signals; and providing an alphanumeric display indicating said operating state of said computer in dependence upon said display signal, and iconic displays indicating said operating state of said computer in dependence upon computer control signals.

9. An apparatus for displaying an operating state of a computer, said apparatus comprising:

a controller for receiving data signals from a local bus, analyzing said data signals and providing output of a display signal representative of said operating state of said computer based on the analysis of said data signals;

driving means for providing output of grid driving signals and segment driving signals in response to said display signal provided from said controller; and a display panel for variably providing iconic displays and a plurality of alphanumeric displays indicating said operating state of said computer in accordance with said grid driving signals and said segment driving signals provided from said driving means.

10. The apparatus as claimed in claim 9, wherein said driving means comprises:

a decoder for decoding said display signal provided from said controller to generate said grid driving signals, and providing output of said grid driving signals to said display panel; and latch means for generating and providing output of said segment driving signals to said display panel in response to said display signal.

11. The apparatus as claimed in claim 9, wherein said display panel comprises a liquid crystal display.

12. The apparatus as claimed in claim 9, wherein said display panel comprises a vacuum fluorescent display.

13. The apparatus as claimed in claim 11, wherein said iconic displays of said display panel comprise a volume level meter for indicating a volume level of sounds provided by said computer, a computer processing speed meter for indicating a processing speed of said computer, a hibernation mode display for indicating execution of a hibernation mode of said computer, a hard disk drive display for indicating that a hard disk of said computer is being accessed, and a turbo mode display for indicating execution of a turbo mode of said computer.

14. The apparatus as claimed in claim 12, wherein said iconic displays of said display panel comprise a volume level meter for indicating a volume level of sounds provided by said computer, a computer processing speed meter for indicating a processing speed of said computer, a hibernation mode display for indicating execution of a hibernation mode of said computer, a hard disk drive display for indicating that a hard disk of said computer is being accessed, and a turbo mode display for indicating execution of a turbo mode of said computer.

* * * * *